UNITED STATES PATENT OFFICE 2,410,007

1-METHYLOLCYCLOHEXYL-CYCLOHEXYL-CARBINOL

Joseph E. Bludworth and Donald P. Easter, Cumberland, Md., assignors to Celanese Corporation of America, a corporation of Delaware No Drawing. Application January 22, 1944, Serial No. 519,352

1 Claim. (Cl. 260—617)

This invention relates to novel organic compounds and relates more particularly to $\Delta^3$-tetrahydrobenzaldol and to the derivatives thereof.

An object of our invention is the preparation of $\Delta^3$-tetrahydrobenzaldol.

Another object of our invention is the reduction of $\Delta^3$-tetrahydrobenzaldol by hydrogenation and the preparation of the methylol cyclohexyl reduction product thereof.

Still another object of our invention is the preparation of the ethers and esters of the methylol cyclohexyl reduction product of $\Delta^3$-tetrahydrobenzaldol.

A further object of our invention is the utilization of said compounds as plasticizing agents, dispersing agents, and the like.

Other objects of our invention will appear from the following detailed description.

The reaction of acrolein with butadiene in accordance with the Diels-Alder condensation yields $\Delta^3$-tetrahydrobenzaldehyde,

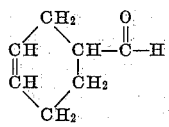

This cyclic aldehyde is quite reactive and, as a starting material, may be employed as a fertile source of novel and valuable synthetic organic materials.

We have now discovered that valuable organic compounds, hitherto unknown, may be obtained by the aldol condensation of $\Delta^3$-tetrahydrobenzaldehyde followed by reduction of the condensation product. On etherification or esterification of the reduced product, we obtain a valuable series of novel ethers and esters. Thus, the aldol condensation of $\Delta^3$-tetrahydrobenzaldehyde yields the aldol condensation product, $\Delta^3$-tetrahydrobenzaldol having the following structural formula:

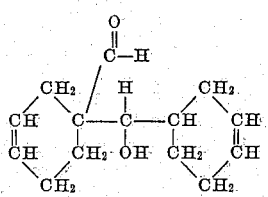

On reduction, this compound yields the polynuclear compound 1-methylolcyclohexyl-cyclohexyl carbinol:

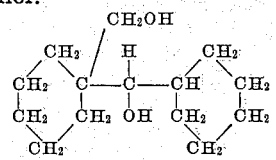

Since this carbinol compound contains a plurality of hydroxy groups it may, as stated, be esterified or etherified with a suitable esterifying or etherifying medium and mono- as well as di-ethers and esters may be obtained. Thus, for example, on esterification there may be obtained di-esters of the following general formula:

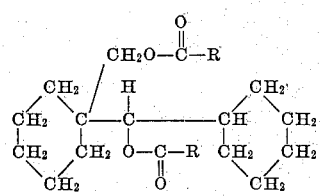

wherein R may be hydrogen or an alkyl, unsaturated alkyl, cycloalkyl, alkaryl, aralkyl, aryl, or heterocyclic radical. By adjusting the mol ratio of esterifying agent to the 1-methylolcyclohexyl-cyclohexyl carbinol, it is, of course, possible to esterify but one of the hydroxy groups and to obtain the corresponding mono-esters of 1-methylolcyclohexyl-cyclohexyl-carbinol. Employing suitable etherifying agents, ethers of the following general formula may be obtained.

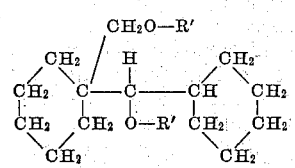

where R' may be an alkyl group, unsaturated alkyl, cycloalkyl, aralkyl, alkaryl, aryl or heterocyclic radical. Mono-ethers may also, of course, be prepared wherein one of the R' groups is hydrogen.

As examples of acids with which our novel 1-methylolcyclohexyl-cyclohexyl-carbinol may be esterified, there may be mentioned formic acid, acetic acid, chloracetic acid, glycollic acid, propionic acid, butyric acid, isobutyric acid, lauric acid, stearic acid, acrylic acid, methacrylic acid, crotonic acid, phenyl acetic acid, tolyl acetic acid, hexahydrobenzoic acid, cinnamic acid, benzoic acid, as well as acids containing a heterocyclic nucleus such as pyromucic acid and α-pyrrolidine carboxylic acid. Polycarboxylic acids such as glutaric, adipic, suberic, succinic, fumaric and maleic acids may also be employed and cyclic esters obtained. In the case of ethers of 1-methylolcyclohexyl-cyclohexyl-carbinol, R' may be the residue of a hydroxy compound, viz., alcohols, such as, for example, methyl, ethyl, propyl, iso-propyl, butyl, sec. butyl, amyl, ethylene chlorohydrin, benzyl, lauryl, stearyl, cyclohexyl, furfuryl, and abietyl alcohol, or ethylene glycol, propylene glycol, phenol, cresol, pyrazolone and hydroxy-pyridine.

The aldol condensation of Δ³-tetrahydrobenzaldehyde may be effected conveniently employing a suitable alkali such as sodium hydroxide or potassium hydroxide to aid the condensation. Advantageously, from 5 to 15 parts by weight of alkali, to 100 parts of Δ³-tetrahydrobenzaldehyde, are employed and, preferably, the alkali is added in the form of a solution in a suitable organic solvent, e. g., ethyl alcohol or the like. The Δ³-tetrahydrobenzaldehyde is placed in a suitable vessel equipped with a stirrer and the alkali solution added slowly while the mixture is stirred. The condensation to Δ³-tetrahydrobenzaldol takes place rapidly with the evolution of heat. The temperature is maintained below about 65° C. during the condensation by applying suitable cooling means and, at the completion of the condensation, the polymer is obtained in the form of a liquid. The aldol is washed twice with an equal volume of water. The water layer is discarded, and the aldol is taken up in twice its volume of ether. The ether solution is dried with anhydrous sodium sulfate and filtered. The resulting mixture is heated to drive off the ether.

The reduction of the Δ³-tetrahydrobenzaldol is effected in ethyl alcohol solution with hydrogen and a Raney nickel catalyst employing pressures of 800 to 2000 lbs. per sq. inch and temperatures of 75 to 125° C. The aldehyde group present is reduced to a hydroxyl group and the double bonds are saturated, thus yielding 1-methylolcyclohexyl-cyclohexyl carbinol:

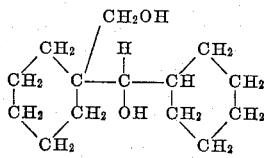

The mono- and di-esters of 1-methylolcyclohexyl-cyclohexyl carbinol may be obtained by esterifying said carbinol compound with the desired organic acid or acid anhydride. Conveniently, the esterification may be effected in solution in a suitable solvent with or without an esterification catalyst, e. g., hydrochloric acid, depending upon the activity of the esterifying acid or anhydride. Where the acid or anhydride is a liquid at esterifying temperatures, the 1-methylolcyclohexyl-cyclohexyl-carbinol may be dissolved in or mixed with the acid or anhydride and the esterification effected by heating the mixture. Excess acid or anhydride may be distilled off or an alcohol forming an ester of relatively low boiling point with the excess or unreacted acid or anhydride may be added to the mixture and, after formation of the lower boiling ester, the mixture may be distilled and the excess acid or anhydride removed as the acid ester of the low boiling alcohol, leaving the higher boiling ester of the 1-methylolcyclohexyl-cyclohexyl-carbinol behind. The latter may then be purified by fractionation or recrystallization or in any other suitable manner. The esterification is preferably effected employing from 1.0 to 5.0 mols of acid or equivalent anhydride for each mol of 1-methylolcyclohexyl-cyclohexyl - carbinol. In addition to organic acid esters of the 1-methylolcyclohexyl-cyclohexyl-carbinol, the latter may also be esterified with inorganic acids, such as sulfuric acid and compounds of valuable detergent and wetting properties obtained.

The etherification of 1-methylolcyclohexyl-cyclohexyl-carbinol may be effected conveniently employing suitable etherifying agents and etherification procedures.

In order further to illustrate our invention but without being limited thereto the following examples are given:

Example I 400 parts by weight of Δ³-tetrahydrobenzaldehyde, prepared by the Diels-Alder condensation of acrolein and butadiene, are placed in a vessel equipped with a suitable stirrer and a saturated solution of sodium hydroxide in 95% ethyl alcohol is added slowly with constant stirring. The temperature rises during the condensation but is kept below about 65° C. during the course of the reaction. The product obtained comprises Δ³-tetrahydrobenzaldol.

500 parts by weight of the above unsaturated aldol condensation product are dissolved in 800 parts by weight of ethyl alcohol. The mixture is entered into a pressure vessel and 50 parts by weight of Raney nickel added thereto. Hydrogen under 1200 lbs. per sq. inch pressure is forced into the pressure vessel and the aldol condensation product is hydrogenated at a temperature of 100° C. The aldehyde group is converted to a hydroxy group and the double bonds are saturated yielding 1-methylolcyclohexyl-cyclohexyl carbinol.

The 1-methylolcyclohexyl-cyclohexyl-carbinol may be esterified in the following manner. 25 parts by weight of the 1-methylolcyclohexyl-cyclohexyl-carbinol are mixed with 25 parts by weight of acetic anhydride and heated to 93° C. for fifteen minutes. Eight parts by weight of ethyl alcohol are then added, the mixture warmed gently for 1 minute, so that the alcohol reacts with excess acetic anhydride. The alcohol remaining is then evaporated off and carries any excess acetic anhydride off as ethyl acetate. The 1-methylolcyclohexyl-cyclohexyl carbinol diacetate formed is purified by washing with water.

Example II

To 226 parts by weight 1-methylolcyclohexyl-cyclohexyl-carbinol in solution in 500 parts diethyl ether is gradually added 46 parts sodium in ribbon form. After the reaction has subsided, 126 parts dimethyl sulfate is added with stirring at such a rate as to keep the mixture briskly refluxing. When the addition of dimethyl sulfate has been completed, the mixture is refluxed in a water bath for twenty-four hours, then washed three times with twice its volume of water. The ether solution is dried with anhydrous sodium sulfate and filtered. The ether is then evaporated off, leaving 1-methylolcyclohexyl-cyclohexyl carbinol dimethyl ether.

The valuable Δ³-tetrahydrobenzaldol may also be oxidized to yield high molecular weight acids which may be employed in the synthesis of various other high molecular weight derivatives.

It is to be understood that the foregoing detailed description is given merely by way of illustration and that many variations may be made therein without departing from the spirit of our invention.

Having described our invention, what we desire to secure by Letters Patent is:

1-methylolcyclohexyl-cyclohexyl-carbinol:

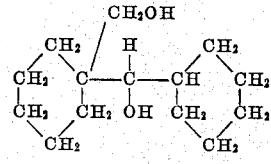

JOSEPH E. BLUDWORTH.
DONALD P. EASTER.